(12) United States Patent
Sato et al.

(10) Patent No.: US 8,648,994 B2
(45) Date of Patent: Feb. 11, 2014

(54) LIQUID CRYSTAL DISPLAY ELEMENT AND METHOD FOR MANUFACTURING THE SAME

(75) Inventors: Osamu Sato, Tokyo (JP); Katsuyoshi Hiraki, Tokyo (JP); Isao Adachi, Tokyo (JP); Dong-Uk Cho, Tokyo (JP); Kento Okoshi, Tokyo (JP); Masatoshi Tokita, Tokyo (JP); Junji Watanabe, Tokyo (JP)

(73) Assignees: LG Display Co., Ltd., Seoul (KR); Tokyo Institute of Technology, Tokyo (JP)

( * ) Notice: Subject to any disclaimer, the term of this patent is extended or adjusted under 35 U.S.C. 154(b) by 520 days.

(21) Appl. No.: 12/982,204

(22) Filed: Dec. 30, 2010

(65) Prior Publication Data
US 2011/0181821 A1 Jul. 28, 2011

(30) Foreign Application Priority Data
Jan. 28, 2010 (JP) .................................. 2010-016705

(51) Int. Cl.
*C09K 19/04* (2006.01)
(52) U.S. Cl.
USPC ........................................................ 349/172
(58) Field of Classification Search
None
See application file for complete search history.

(56) References Cited

FOREIGN PATENT DOCUMENTS

| JP | S56-107216 | 8/1981 |
|---|---|---|
| JP | S62-131225 | 6/1987 |
| JP | H02-240192 | 9/1990 |
| JP | H02-271326 | 11/1990 |
| JP | H03-042622 | 2/1991 |
| JP | 6-148643 A | 5/1994 |
| JP | 06148643 A * | 5/1994 |
| JP | 06281964 A * | 10/1994 |
| JP | H06-281966 | 10/1994 |
| JP | 7-048572 A | 2/1995 |
| JP | 11-038361 A | 2/1999 |
| JP | 2004-086116 | 3/2004 |
| JP | 2004-094227 A | 3/2004 |

OTHER PUBLICATIONS

Saito et al., Machine Translation of Detailed Description of JP 06-148643A, May 1994.*
Endo et al., Machine Translation of Detailed Description of JP 06-281964, Oct. 1994.*
Hideo Fujikake et al. "Polymer-Stabilized Ferroelectric Liquid Crystal Devices with grayscale Memory", Japanese J. Appl. Phys, vol. 36, pp. 6449-6454, 1997.

* cited by examiner

*Primary Examiner* — Michelle R Connelly
(74) *Attorney, Agent, or Firm* — McKenna Long & Aldridge LLP

(57) ABSTRACT

Disclosed are a liquid crystal display element exhibiting a continuous gradation memory property as well as different display properties substantially similar to those of a liquid crystal display element having nematic liquid crystals, while enabling continuous tone display, and a method for manufacturing the same.

10 Claims, 9 Drawing Sheets

VARIATION IN LUMINANCE AFTER VOLTAGE INTERRUPTION
WHEN INTENSITY OF APPLIED VOLTAGE IS VARIED
AT A CONSTANT TIME FOR VOLTAGE APPLICATION OF 1ms
(FROM BLACK TO WHITE)

VARIATION IN LUMINANCE AFTER VOLTAGE INTERRUPTION
WHEN VOLTAGE APPLICATION TIME IS VARIED
AT A CONSTANT APPLIED VOLTAGE OF 5V
(FROM BLACK TO WHITE)

FIG. 7

| Liquid crystal | LCD mode | bistability | Continuous tone display | Continuous gradation memory property | Response time | Contrast | Orientation stability | Application of a rubbing method |
|---|---|---|---|---|---|---|---|---|
| NLC | TN, IPS, VA, etc. | × | ○ | × | ○− | ○ | ◉ | ○ |
| Lower molecular FLC | SS-FLC | ○ | × (area coverage gradation and/or frame gradation are needed) | × | ◉ | △ | △ | ○ |
| | H-V,V | × | ○ | × | ◉ | △ | △ | ○ |
| High molecular FLC | SS-FLC (Shearing method) | ○ | × (area coverage gradation and/or frame gradation are needed) | × | ○ | △ | ○ | × (shearing method) |
| Present invention (high molecular FLC) | SS-FLC (Rubbing method) | ○ | ○ | ○ | ○+ | ○ | ○ | ○ |

FIG. 10

| Liquid crystal | LCD mode | bistability | Continuous tone display | Continuous gradation memory property | Response time | contrast | Orientation stability | Application of a rubbing method | NOTE |
|---|---|---|---|---|---|---|---|---|---|
| NLC | TN, IPS, VA, etc. | × | ○ | × | ○– | ○ | ◉ | ○ | Intention of improving high-speed response |
| Low molecular FLC | SS-FLC | ○ | × (area coverage gradation and/or frame gradation are needed) | × | ◉ | △ | △ | ○ | High-speed response is possible, Continuous tone display is impossible, Low orientation stability, and Low contrast ratio |
| Low molecular FLC | H-V, V | | ○ | × | ◉ | △ | △ | ○ | High-speed response is possible, continuous tone display is possible, Low orientation stability, and Low contrast ratio |
| High molecular FLC | SS-FLC (shearing method) | ○ | × (area coverage gradation and/or frame gradation are needed) | × | ○ | △ | ○ | × (shearing method) | Motion picture response is possible, Continuous tone display is impossible, Low contrast ratio, and A rubbing method cannot be used |

LIQUID CRYSTAL DISPLAY ELEMENT AND METHOD FOR MANUFACTURING THE SAME

This application claims the benefit of Japan Patent Application No. JP-2010-016705, filed on Jan. 28, 2010, which is hereby incorporated by reference as if fully set forth herein.

BACKGROUND OF THE INVENTION

1. Field of the Invention

The present invention relates to a liquid crystal display element including high molecular weight ferroelectric liquid crystals (referred to as "high molecular FLCs") as a liquid crystal material, as well as a method of manufacturing the same.

2. Discussion of the Related Art

Recently, as an image display device with improved features such as a small thickness, light weight and reduced energy consumption, a liquid crystal display ('LCD') device is widely used. The majority of LCD devices conventionally known in the art employ nematic liquid crystals ('NLCs').

As shown in FIG. 8, an LCD element containing NLCs generally consists of two opposing substrates 51, transparent electrodes 52 respectively provided at opposing sides of the facing substrates 51, alignment films 53 which are oriented by a rubbing method and provided on each of the transparent electrodes 52 of the substrates 51, and a liquid crystal layer 54 formed by introducing (or charging) nematic liquid crystals between the substrates 51.

Various LCD modes using NLCs such as TN (Twisted Nematic), ECB (Electrically Controlled Birefringence), STN (Super Twisted Nematic), IPS (In-Plane Switching) and VA (Vertical Alignment), etc. are currently employed. However, NCL-based LCD elements do not have any inherent bistability (memory property), although they do enable continuous tone display.

The NLC-based LCD element shows improved uniformity in orientation, thus enabling displays with a high contrast ratio. In order to orient NLCs, an alignment film oriented by a rubbing method may be used, that is, a rubbing method may be employed in orientation of NLCs. Although an NLC-based LCD element can achieve response times suitable for standard household televisions and the like (suitable for standard motion picture playback), inherent properties of NLCs make high-speed response of less than 1 ms difficult to achieve.

Therefore, in order to improve the response time of an LCD element, a surface stabilized-ferroelectric liquid crystal (SS-FLC) mode LCD element formed using low molecular weight ferroelectric liquid crystals, instead of NLCs, has been proposed. Such SS-FLC mode LCD elements employing low molecular weight ferroelectric liquid crystals (referred to as "low molecular FLCs") has a structure in which low molecular FLCs are applied to a liquid crystal layer 54 shown in FIG. 8.

The SS-FLC mode LCD element with low molecular FLCs may improve response time compared to the NLC-based LCD elements. However, due to inherent bistability of the SS-FLC mode LCD element, this LCD element cannot easily embody continuous tone display. Continuous tone display provided by the SS-FLC mode LCD element employing low molecular FLCs entails specific technological challenges, for example, area coverage gradation, domain gradation, frame gradation, etc. (see Japanese Unexamined Patent Publication No. S62-131225), complex structures, high production costs, and so forth.

In SS-FLC mode LCD elements employing low molecular FLCs, the low molecular FLCs have a layered structure and show reduced orientation stability, compared to an NLC-based LCD element. Other problems such as difficulty in uniform orientation, reduced contrast ratio as compare to NLC-based LCD elements, and the like are encountered. Moreover, in order to orient NLCs, an alignment film oriented by a rubbing method may be used, that is, a rubbing method may be employed in orientation of NLCs.

At the expense of inferior bistability of the SS-FLC mode LCD element containing low molecular FLCs, Half-V (H-V) mode or V mode LCD elements to provide continuous tone display have been disclosed (see Japanese Unexamined Patent Publication No. 2004-86116).

The H-V mode or V mode LCD element employing low molecular FLCs has been proposed as a fast response time version of NCL-based LCD elements.

More particular, such H-V mode or V mode LCD element employing low molecular FLCs provides faster response times than NLC-based LCD elements and, in addition, may enable continuous tone display at the expense of reduced bistability.

For the H-V mode or V mode LCD element employing low molecular FLCs, the low molecular FLCs have a layered structure and show worse orientation stability than NLC-based LCD elements. Other problems such as difficulty in uniform orientation, decreased contrast ratio as compared to NLC-based LCD elements, and the like, are encountered. Moreover, in order orient NLCs, an alignment film oriented by a rubbing method may be used, that is, a rubbing method may be employed in orientation of NLCs.

In order to enhance orientation stability of the SS-FLC mode LCD element containing low molecular FLCs, improved SS-FLC mode LCD elements containing high molecular FLCs have been disclosed (for example, Japanese Unexamined Patent Publication Nos. S56-107216; H02-240192; H02-271326; H03-42622; and H06-281966).

As shown in FIG. 9, such an SS-FLC mode LCD element employing high molecular FLCs generally includes two opposing substrates 61, a transparent electrodes 62 respectively provided on facing sides of the substrates 61, and a liquid crystal layer 63 formed by introducing high molecular FLCs between the substrates 61. In this regard, provision of shear stress to the substrates 61 (a shearing method) while applying voltage between two substrates 61 may achieve orientation of the high molecular FLCs, thereby achieving orientation of the liquid crystal layer 63.

The SS-FLC mode LCD element employing high molecular FLCs exhibits a response time comparable to that of an NLC-based LCD element, although shortcomings such as a slower response (that is, a longer response time) than that of a low molecular FLC-based SS-FLC mode LCD element, due to the high molecular weight and relatively high viscosity of the FLCs, are encountered. Since the SS-FLC mode LCD element employing high molecular FLCs exhibits inherent bistability, simple continuous tone display is not possible. In order to perform continuous tone display, specific technologies such as area coverage gradation, domain gradation, frame gradation, etc. as described above are further required. However, in such case, some problems such as the necessity of complex structures, high production costs, etc. are encountered.

Since the SS-FLC mode LCD element employing high molecular FLCs has a layered structure of high molecular FLCs as well as a relatively high molecular weight, orientation stability is superior to that of an LCD element containing low molecular FLCs, while being worse than that of NLC-based LCD elements. Owing to such a layered structure comprising high molecular FLCs, it is difficult to provide uniform orientation. Therefore, the contrast ratio of the foregoing LCD element is not comparable to that of the NLC-based LCD element. Further, since their high molecular weight means that uniform orientation is not readily obtained using a rubbing method, a more complex shearing method should be used to provide uniform orientation.

In addition, conventional NLC-based LCD elements, low molecular FLC-based LCD elements (SS-FLC mode, H-V mode, V mode) and high molecular FLC-based LCD elements (SS-FLC (shearing method)) all enable continuous tone display, while not having continuous gradation memory properties to maintain (or memory) the current state of gradation when voltage is interrupted. Here, FIG. 10 shows a list of different display properties of conventional LCD elements.

A relation (a potential curve) between orientation angles (varied by voltage application) of an LCD element to enable continuous tone display (for example, NLCs, H-V mode, V mode) and potentials, is shown in FIG. 11. As can be seen from FIG. 11, use of an alignment film oriented using a rubbing method has a significant influence upon the potential curve.

For the SS-FLC mode LCD element having bistability with lower molecular or high molecular FLCs, liquid crystal molecules move to a bistable position upon voltage application. A relation (a potential curve) between orientation angles of the SS-FLC mode LCD element containing low molecular or high molecular FLCs and potentials is shown in FIG. 12.

As described above, conventional LCD elements cannot retain a set gradation once voltage is no longer applied thereto.

Therefore, the conventional LCD element entails a problem in that it does not exhibit a gradation memory property to maintain (or memory) the current gradation at continuous tone display when voltage is interrupted, while still performing the continuous tone display.

Under such circumstances, application of a domain gradation to provide continuous gradation memory properties has been disclosed (for example, see Hideo Fujikake et al. "Polymer-Stabilized Ferroelectric Liquid Crystal Devices with grayscale Memory", Jpn. J. Appl. Phys, Vol. 36, pp. 6449-6454, 1997).

SUMMARY OF THE INVENTION

Conventional technologies have the following problems.

Application of a domain gradation to provide continuous gradation memory properties entails problems such as a complex structure or manufacturing process, increased production costs, reduced productivity, and so forth.

The present invention is directed to solve the foregoing problems and an object of the present invention is to provide a liquid crystal display element that enables continuous tone display and exhibits continuous gradation memory properties, while having favorable display properties substantially comparable to general NLC-based LCD elements, without requiring a complex structure or manufacturing process.

According to the present invention, there is provided an LCD element, including: first and second substrates facing each other; first and second alignment films which are oriented by a rubbing method and provided on opposite sides of the first and second substrates, respectively; and a liquid crystal layer formed by introducing and charging a liquid crystal material containing high molecular ferroelectric liquid crystals ('high molecular FLCs') between the first and second substrates.

According to the present invention, there is also provided a method for manufacturing an LCD, including: preparing first and second substrates to face each other; providing first and second alignment films oriented by a rubbing method, on opposites sides of the first and second substrates, respectively; and introducing and charging a liquid crystal material containing high molecular FLCs between the first and second substrates having the first and second alignment films formed thereon, respectively, so as to form a liquid crystal layer.

With regard to the LCD element and the method for manufacturing the same according to the present invention, the first and second alignment films oriented by a rubbing method are formed at opposing sides of the first and second substrates, respectively. Additionally, a liquid crystal material containing high molecular FLCs is introduced and charged between the first and second substrates, thereby forming the liquid crystal layer. A structure and a process for manufacturing the foregoing LCD element are substantially similar to those for fabrication of an NLC-based LCD element, except that liquid crystals used herein are structurally different than those of the NLC-based LCD element.

In this regard, since the alignment film oriented by the rubbing method is combined with the high molecular FLCs, uniformity in orientation may be improved and contrast effects substantially comparable to NLC-based LCD elements may be attained. Moreover, such combination of the alignment film oriented by the rubbing method with the high molecular FLCs results in the formation of a plateau region in the potential curve of the LCD element.

Consequently, an LCD element enabling continuous tone display, having display properties comparable to those of typical NLC-based LCD elements and being capable of realizing a continuous gradation memory may be produced without a complex structure or manufacturing process.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a drawing demonstrating differences in display properties of an LCD element according to one embodiment of the present invention as compared to conventional LCDs;

FIG. 10 illustrates different display properties of conventional LCD elements;

DETAILED DESCRIPTION OF THE INVENTION

Figure 1:
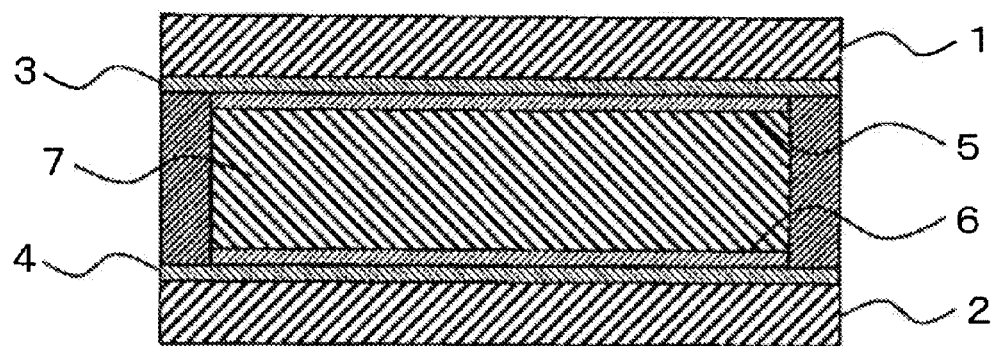
FIG. 1 is a cross-sectional view illustrating technical configurations of an LCD element according to one embodiment of the present invention.

Hereinafter, preferred embodiments of an LCD element according to the present invention will be described in detail in conjunction with the accompanying drawings. Like or similar constitutional parts in the drawings are denoted by the same reference numbers.

Exemplary Embodiment 1

FIG. 1 is a cross-sectional view illustrating the technical configuration of an LCD element according to one embodiment of the present invention.

Referring to FIG. 1, the LCD element comprises a first substrate 1, a second substrate 2, a first transparent electrode 3, a second transparent electrode 4, a first alignment film 5, a second alignment film 6 and a liquid crystal layer 7.

Each of the facing first and second substrates 1 and 2 is a glass sheet and a liquid crystal material comprising high molecular weight ferroelectric liquid crystals ('high molecular FLCs') is introduced and charged between these substrates 1 and 2. Such liquid crystal material is a mixture of high molecular FLCs and low molecular weight liquid crystals. A backlight (not shown) functioning as a light source is mounted opposite the side of the liquid crystal layer 7 on the first substrate 1 and light from the backlight is incident upon the first substrate 1.

The first transparent electrode 3 is provided at one side of the first substrate 1 facing the second substrate 2. Likewise, the second transparent electrode 4 is formed at one side of the second substrate 2 facing the first substrate 1. The first transparent electrode 3 and the second transparent electrode 4 may be respectively a pixel electrode and an opposite electrode, and form an electric field perpendicular to the first and second substrates 1 and 2.

The first alignment film 5 is provided on top of the first transparent electrode 3 of the first substrate 1 and is oriented by a rubbing method. Likewise, the second alignment film 6 is formed on top of the second transparent electrode 4 of the second substrate 2 and is oriented by a rubbing method. A vertical direction of the liquid crystal layer 7 is oriented toward a direction of the rubbing operation.

Next, the following description will be given to explain a stepwise process for fabrication of an LCD element according to the foregoing embodiment of the present invention in sequential order.

First, the first transparent electrode 3 and a thin film transistor (TFT; not shown) are formed on the first substrate 1 by a conventional method such as sputtering. Then, a color filter (not shown) is formed on the second substrate 2 and the second transparent electrode 4 is formed on the color filter of the second substrate 2.

After washing the first and second substrates 1 and 2, polyimide is applied to the first transparent electrode 3 and TFT of the first substrate 1 and to the second transparent electrode 4 of the second substrate 2, respectively. Continuously, the first substrate 1 and the second substrate 2 coated with polyimide are subjected to pre-baking treatment and a main curing process, followed by rubbing to achieve orientation thereof. As a result, first and second alignment films 5 and 6 are formed on the substrates 1 and 2, respectively.

Subsequently, after washing the first and second substrates 1 and 2, a sealing material is applied to a peripheral side of the first substrate 1 and the first substrate 1 is adhered to the second substrate 2. Then, a liquid crystal material comprising a mixture of high molecular FLCs represented by the following Chemical Formula 1 and low molecular FLCs is introduced and charged between the first and second substrates 1 and 2 adhered to each other, followed by annealing, thus forming a liquid crystal layer 7. In this regard, admixing the high molecular FLCs with the low molecular FLCs may decrease the viscosity of the liquid crystal material, thus improving response time and increasing the operating temperature range within which the liquid crystal material is movable (or has mobility). Here, the liquid crystal material may comprise high molecular FLCs alone.

Chemical Formula 1

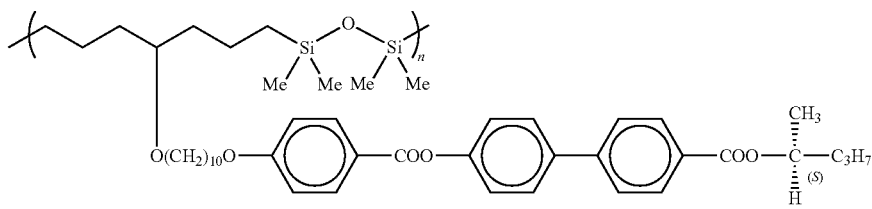

Alternatively, alternatively to introduction of the liquid crystal material between the adhered first and second substrates 1 and 2, the liquid crystal material may be added dropwise to the top of the first substrate 1 coated with a sealing material before the first and second substrates 1 and 2 are adhered to each other. Directly dropping the liquid crystal material onto the substrate may dramatically reduce the time required to charge liquid crystals between the substrates.

Following this, an LCD containing the liquid crystal layer 7 formed thereon is subjected to aging to slowly cool the LCD down to room temperature while applying voltage thereto thereby precisely orienting FLCs in a desired bistable position.

As previously described, the conventional SS-FLC mode LCD element with high molecular FLCs requires a complex process to orient the high molecular FLCs by apply shear stress during aging while applying voltage to the LCD element. However, the foregoing LCD element according to one embodiment of the present invention does not require such a complex process.

The following description will be given to explain assessment results of different display properties of an LCD element fabricated according to the foregoing manufacturing process.

Figure 11:
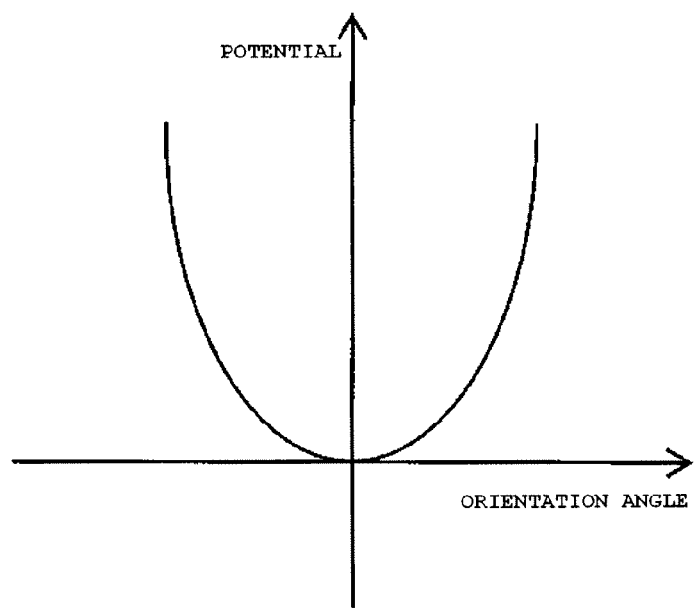
FIG. 11 illustrates a potential curve of an LCD element enabling continuous tone display.
Figure 12:
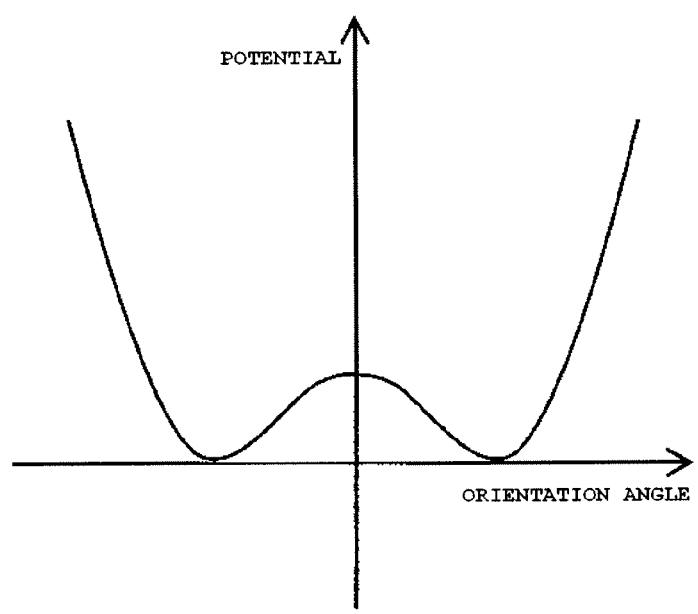
FIG. 12 illustrates a potential curve of a low molecular or high molecular FLC.

(1) Regarding Continuous Tone Display, Continuous Gradation Memory Property and Bistability When the first alignment film 5 and the second alignment film 6 oriented by a rubbing method are combined with the liquid crystal material containing high molecular FLCs, the LCD element according to one embodiment of the present invention may have a potential curve obtained by combination of individual potential curves shown in FIGS. 11 and 12.

Figure 2:
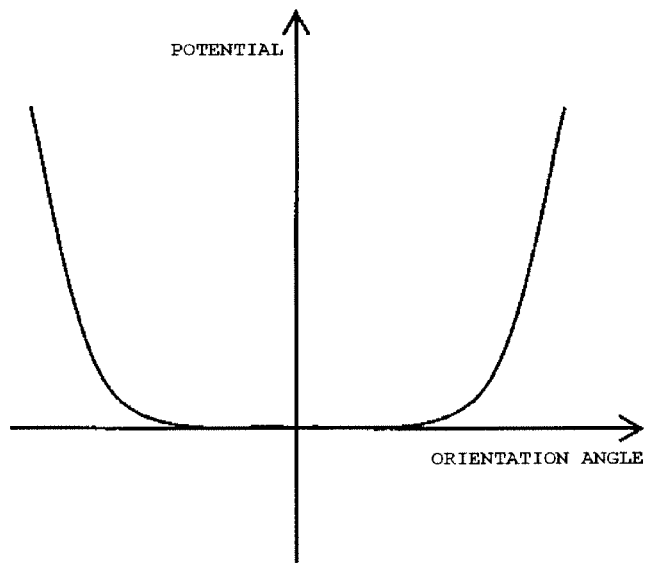
FIG. 2 illustrates a potential curve of an LCD element according to one embodiment of the present invention.

FIG. 2 shows the potential curve of the LCD element according to one embodiment of the present invention. Such a potential curve indicates an ideal state of the LCD.

Referring to FIG. 2, the potential curve of the LCD element has a plateau region. Therefore, in the plateau region of the potential curve, voltage may be applied or continuous gradation control may be embodied depending on voltage application time and, in addition, it is possible to memory the current state of gradation even when voltage is interrupted.

Figure 3:
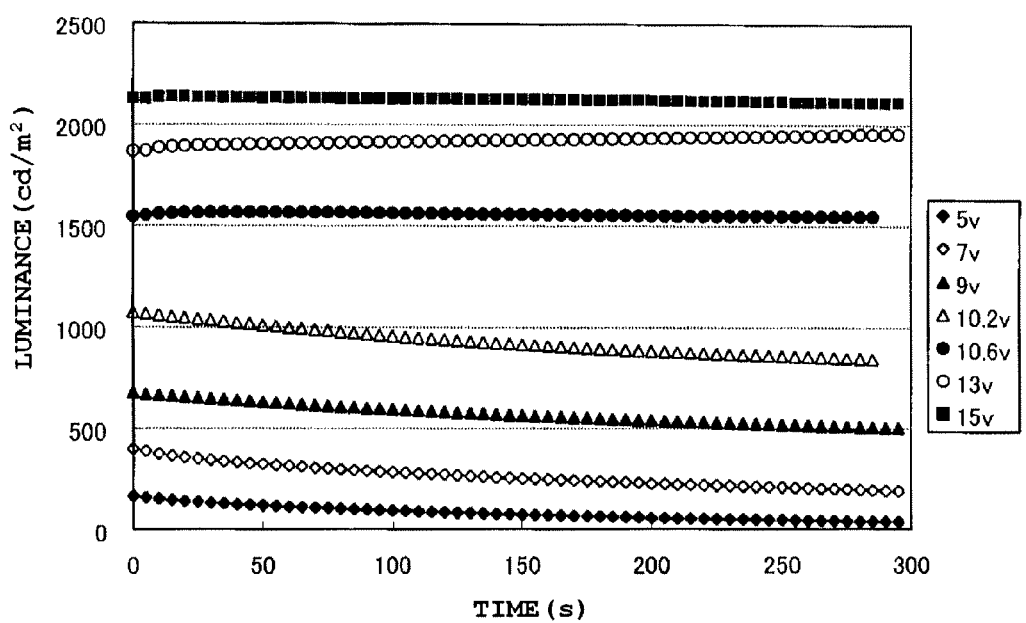
FIG. 3 shows graphs depicting a relationship between applied voltage, which is varied at a constant voltage application time, and gradation memory properties of an LCD element according to one embodiment of the present invention.
Figure 4:
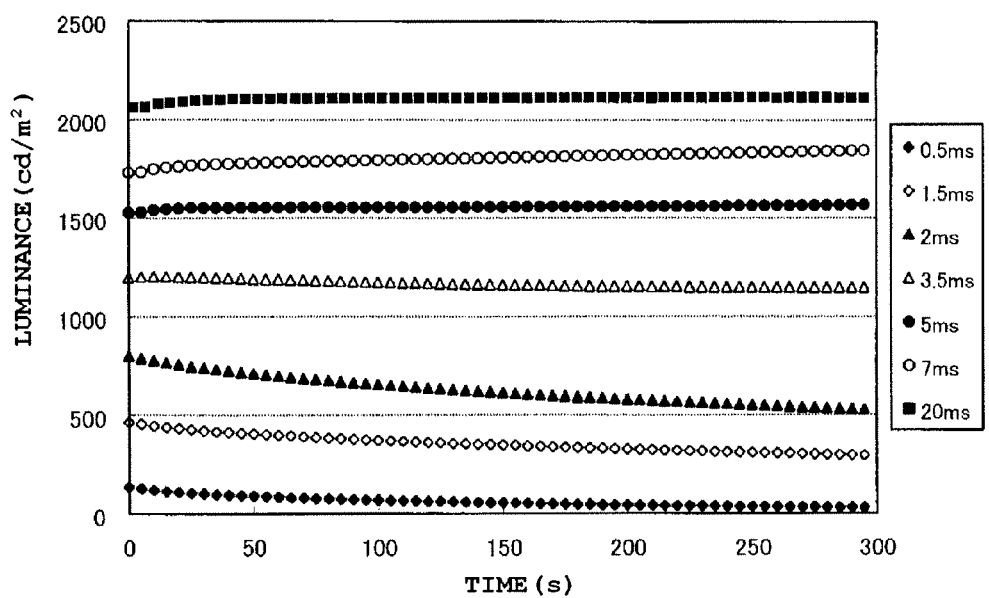
FIG. 4 shows graphs depicting a relationship between voltage application time, which is varied at a constant applied voltage, and gradation memory properties of an LCD element according to one embodiment of the present invention.

After applying voltage for a constant time (1 ms) to the LCD element, variation of luminance when a circuit is turned off was measured while adjusting applied voltage. Results thus obtained are shown in FIG. 3. Alternatively, after applying a constant voltage to the LCD element, variation of luminance when a circuit is turned off was measured while varying a time for voltage application. Results thus obtained are shown in FIG. 4. Referring to FIGS. 3 and 4, a time when the circuit is turned off was defined as '0.' From FIGS. 3 and 4, it is clear that gradation may be controlled depending on voltage intensity or voltage duration, and the current state of gradation may be memorized (that is, a gradation memory function may be achieved).

Figure 5:
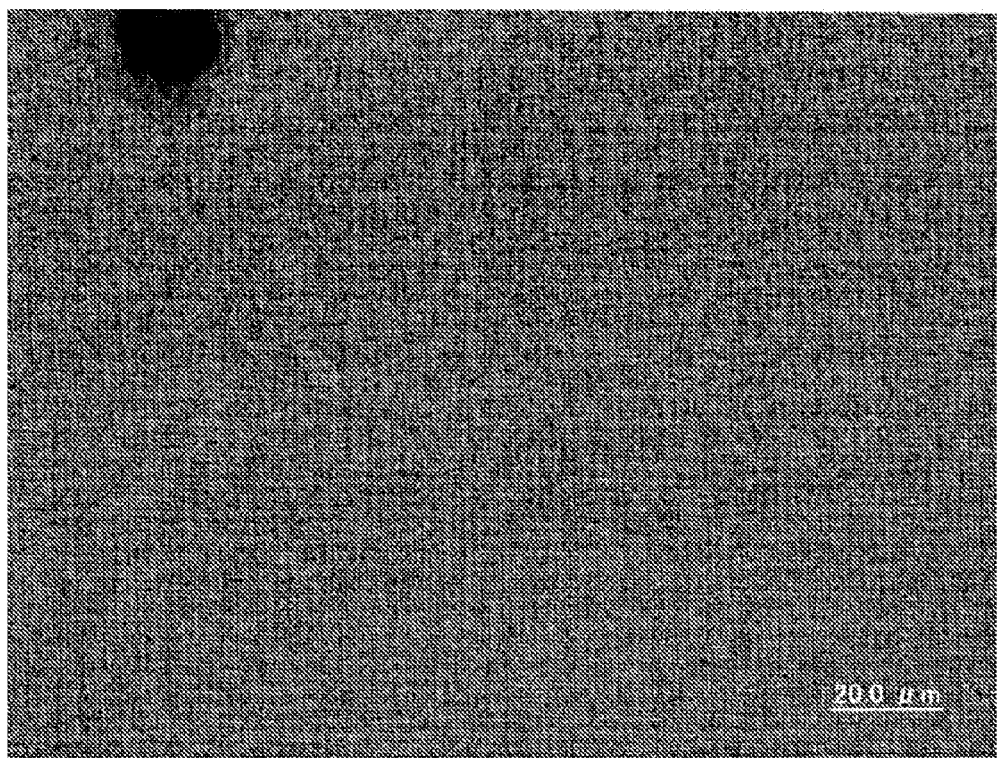
FIG. 5 is a polarized optical micrograph showing liquid crystal orientation in black, white and grayscale display states according to one embodiment of the present invention.

FIG. 5 is a polarized optical micrograph showing liquid crystal orientations of an LCD element according to one embodiment of the present invention in black, white and grayscale modes. From FIG. 5, it can be seen that orientation is uniform even in during grayscale display and any domain is not present in the LCD element. Therefore, it is determined that the continuous gradation memory properties according to the present invention are not a domain gradation property but inherent gradation memory properties in that variation in molecular orientation is uniform across all pixels.

In other words, the LCD element according to one embodiment of the present invention may enable continuous tone display without requiring specific technologies such as area coverage gradation, domain gradation, frame gradation, etc., and exhibits continuous gradation memory properties to maintain the current state of gradation when voltage is interrupted.

Figure 6:
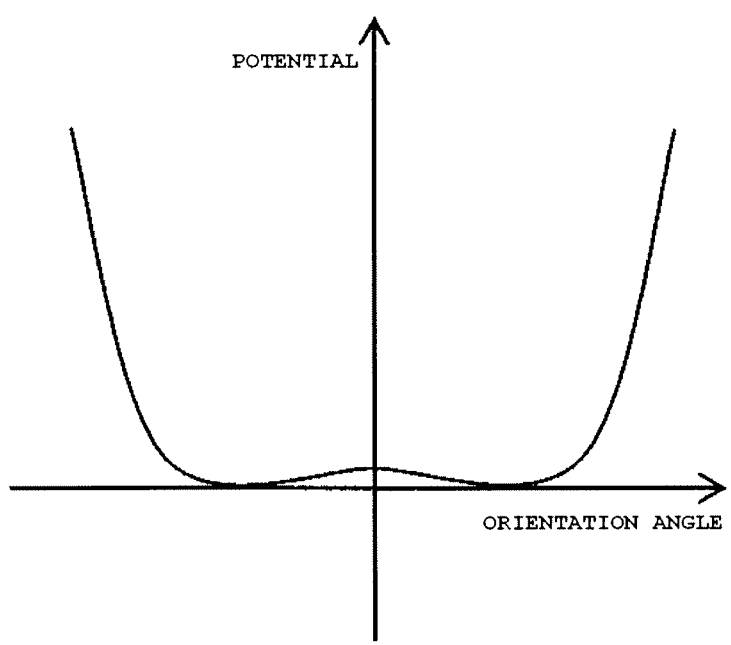
FIG. 6 illustrates another potential curve of an LCD element according to one embodiment of the present invention.
Figure 8:
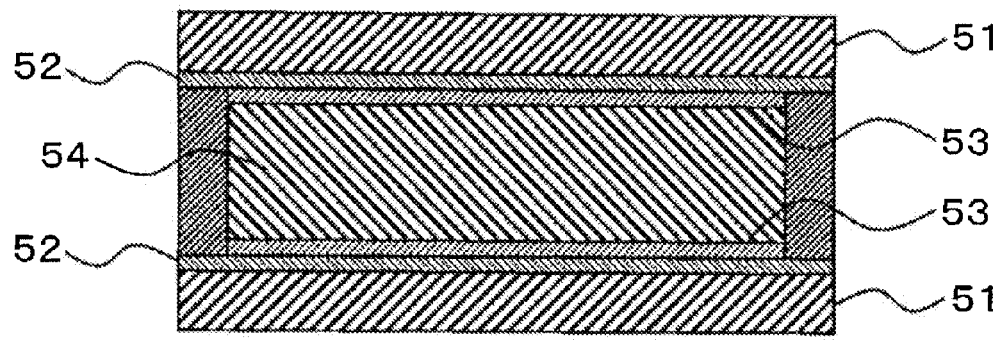
FIG. 8 is a cross-sectional view illustrating technical configuration of an LCD element containing NLCs.
Figure 9:
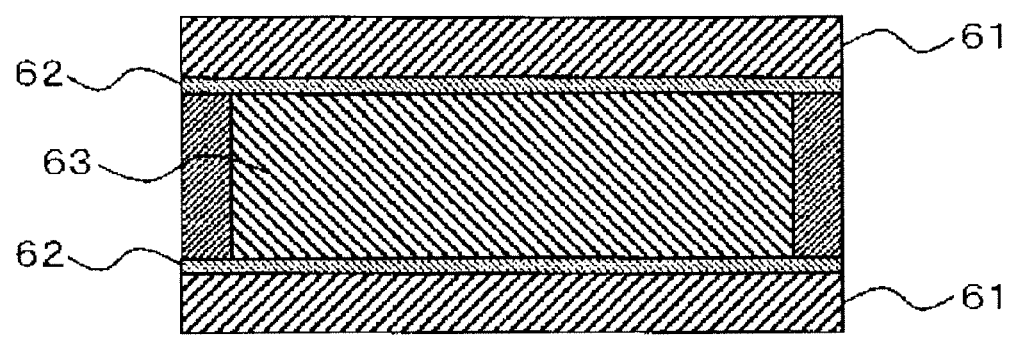
FIG. 9 is a cross-sectional view illustrating technical configuration of an SS-FLC mode LCD element containing high molecular FLCs.

Alternatively, unlike the ideal potential curve shown in FIG. 2, when a potential curve has a convex region in the middle as shown in FIG. 6, the LCD element driven based on this potential curve exhibits bistability. The foregoing LCD element also enables continuous tone display owing to influence of visco-elastic properties of the high molecular FLCs, and may exhibit a continuous gradation memory. That is, bistability as well as continuous tone display may be simultaneously attained.

(2) Regarding Response Time

Response time of the LCD element according to one embodiment of the present invention was measured using an LCD element testing apparatus (LCD-5200; manufactured by Otsuka Electronics Co. Ltd.).

As a result of the test, it was found that, when the applied voltage is 10V, a time 'tr' taken for the LCD element to switch from black (transmittance 10%) to white (transmittance 90%) is 1.90 ms while a time 'tf' taken for the LCD element to switch from white (transmittance 90%) to black (transmittance 10%) is 1.67 ms. Also, when the applied voltage is 20V, 'tr' of the LCD element from black (transmittance 10%) to white (transmittance 90%) was 0.79 ms while 'tf' of the LCD element from white (transmittance 90%) to black (transmittance 10%) was 0.73 ms.

From the results of the foregoing test, it can be seen that the LCD element according to one embodiment of the preset invention exhibits a response time equal or superior to an NLC-based LCD element, based on features of high molecular FLCs. In addition, when the applied voltage is 20V, high-speed, sub-millisecond response times of less than 1 ms can be achieved.

(3) Regarding Contrast Ratio

Contrast ratio of the LCD element according to one embodiment of the present invention was determined using an LCD element testing apparatus (LCD-5200; manufactured by Otsuka Electronics Co. Ltd.). As a result of measurement, it was found that a transmission contrast ratio is about 140 when the applied voltage is 10V.

The results of the foregoing test definitively showed that the LCD element according to one embodiment of the present invention provides contrast ratios comparable to IPS mode LCD elements having NLCs. The foregoing results are believed to be owing to combination of: orientation of the first and second alignment films 5 and 6 through a rubbing method; and use of the liquid crystal material containing high molecular FLCs, thereby enhancing uniformity in orientation.

(4) Regarding Orientation Stability (Impact Resistance)

FLCs of the LCD element according to one embodiment of the present invention have a layered structure, thus exhibiting orientation stability substantially similar to that of an NLC-based LCD element. However, since high molecular FLCs have a relatively high molecular weight, LCD elements utilizing such high molecular FLCs exhibit remarkably superior orientation stability to an LCD element containing low molecular FLCs. That is, the inventive LCD element may have substantially the same orientation stability as the high molecular FLC-based LCD element (SS-FLC (shearing method)) described above.

(5) Regarding Use of a Rubbing Method

As described above in regard to the process for manufacturing an LCD element, the LCD element according to one embodiment of the present invention may be subjected to a rubbing method, as compared to an LCD element having high molecular FLCs (SS-FLC (shearing method)). Accordingly, the inventive LCD element may be produced on a conventional production line for manufacture of LCD elements.

FIG. 7 shows a list of different display properties of an LCD element according to one embodiment of the present invention, compared to conventional LCD elements.

FIG. 7 demonstrates that the LCD element according to one embodiment of the present invention has excellent display properties and may be represented as "◯" in terms of all items listed in FIG. 7. Also, an improved LCD mode exhibiting a continuous gradation memory property and both bistability and continuous tone display is achieved.

As described above, according to one embodiment of the present invention, first and second alignment films oriented by a rubbing method may be formed on at opposing sides of first and second substrates, respectively. Also, a liquid crystal layer may be formed by introducing a liquid crystal material containing high molecular FLCs between the first and second substrates. A structure and a process for manufacturing the LCD element of the present invention is substantially similar to those used for NLC-based LCD elements, except that liquid crystals used herein are different from those of the NLC-based LCD elements.

In this regard, combination of the alignment film oriented by a rubbing method with the high molecular FLCs may enhance uniformity in orientation and provide comparable contrast ratios to NLC-based LCD elements. In addition, such combination of the alignment film oriented by a rubbing method with the high molecular FLCs may produce a plateau region on a potential curve of the LCD element.

Consequently, an improved LCD element enabling continuous tone display and capable of memorizing the current state of gradation after voltage is interrupted, while having display properties comparable to those of NLC-based LCD elements generally used in the art, may be manufactured without a complex structure and/or production process.

Furthermore, since the inventive LCD element exhibits continuous gradation memory properties while embodying continuous tone display, an electronic paper enabling motion picture response and capable of memorizing the current state of gradation after voltage is interrupted during freeze-frame (or still-image) display, may be realized. Alternatively, both bistability and continuous tone display may be provided, thereby enabling complete still-image display in 2D-grayscale. During still-image display, voltage is interrupted and the current gradation is retained, thereby effectively decreasing power consumption.

As continuous tone display may be executed without other technologies such as area coverage gradation, domain gradation, frame gradation, etc., the present invention requires neither a complex structure not high production costs. In addition, since the domain gradation is not adopted, high contrast ratios can be attained. Moreover, the present invention may employ a rubbing method, thus enabling use of conventional production lines for manufacture of LCD elements.

Although technical constructions and other features of the present invention have been described, it will be apparent to those skilled in the art that the present invention is not limited to the exemplary embodiments and accompanying drawings described above but may cover substitutions, variations and/or modifications thereof without departing from the scope of the invention defined in the appended claims.

What is claimed is:

1. A liquid crystal display (LCD) element, comprising:
   first and second substrates facing each other;
   first and second alignment films which are oriented by a rubbing method and provided at opposing sides of the first and second substrates, respectively; and
   a liquid crystal layer formed by introducing and charging a liquid crystal material containing high molecular weight ferroelectric liquid crystals ('high molecular FLCs') between the first and second substrates,
   wherein the high molecular FLCs are represented by the following Chemical Formula:

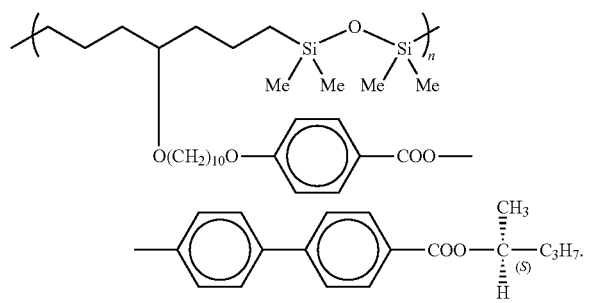

2. The LCD element according to claim 1, wherein the liquid crystal material comprises the high molecular FLCs alone.

3. The LCD element according to claim 1, wherein the liquid crystal material comprises a mixture of the high molecular FLCs as well as low molecular weight liquid crystals.

4. A method for manufacturing an LCD element, comprising:
   preparing first and second substrates to face each other;
   providing first and second alignment films oriented by a rubbing method to opposing sides of the first and second substrates, respectively; and
   introducing and charging a liquid crystal material containing high molecular FLCs between the first and second substrates which have the first and second alignment films formed thereon, respectively, so as to form a liquid crystal layer,
0
   wherein the high molecular FLCs are represented by the following Chemical Formula:

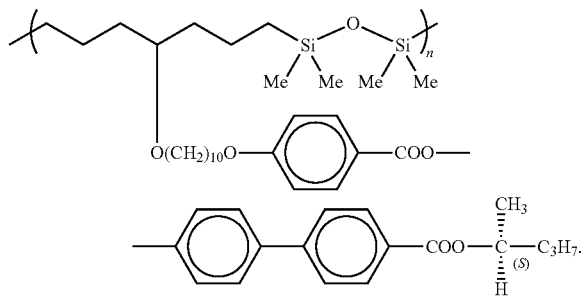

5. The method according to claim 4, wherein the liquid crystal material comprises the high molecular FLCs alone.

6. The method according to claim 4, wherein the liquid crystal material comprises a mixture of the high molecular FLCs as well as low molecular weight liquid crystals.

7. The method according to claim 4, wherein the liquid crystal material containing the high molecular FLCs is introduced and charged between the substrates, followed by annealing the same.

8. The method according to claim 4, further comprising applying a sealing material to a peripheral side of the first substrate and combining the first substrate with the second substrate, before the liquid crystal material containing the high molecular FLCs is introduced and charged between the substrates.

9. The method according to claim 4, wherein the liquid crystal layer is formed by directly dropping the liquid crystal material in a water drop form on the first substrate coated with the sealing material.

10. The method according to claim 4, wherein the first and second substrates having the liquid crystal layer formed thereon are subjected to aging to slowly cool the substrates down to room temperature through adjustment of applied voltage, so as to orient the FLCs toward any bistable positions.

* * * * *